United States Patent [19]
Bowers et al.

[11] 3,814,888
[45] June 4, 1974

[54] SOLID STATE INDUCTION COOKING APPLIANCE

[75] Inventors: David L. Bowers, Wauwatosa, Wis.;
Donald S. Heidtmann, Louisville, Ky.; John D. Harnden, Jr., Schenectady, N.Y.

[73] Assignee: General Electric Company, Schenectady, N.Y.

[22] Filed: Nov. 19, 1971

[21] Appl. No.: 200,526

[52] U.S. Cl......... 219/10.49, 219/10.77, 219/10.79, 321/27
[51] Int. Cl. ............................................. H05b 5/04
[58] Field of Search........... 219/10.49, 10.75, 10.77, 219/10.79; 321/27, 24, 43

[56] References Cited
UNITED STATES PATENTS

| | | | |
|---|---|---|---|
| 1,992,515 | 2/1935 | Uhlmann | 219/10.49 |
| 3,256,417 | 6/1966 | Merrett | 219/10.79 |
| 3,383,579 | 5/1968 | Hung | 321/24 |
| 3,460,025 | 8/1969 | DiPrisco | 321/43 |
| 3,710,062 | 1/1973 | Peters | 219/10.49 |

FOREIGN PATENTS OR APPLICATIONS

| | | | |
|---|---|---|---|
| 1,157,711 | 7/1969 | Great Britain | 219/10.49 |
| 1,068,031 | 5/1967 | Great Britain | |

OTHER PUBLICATIONS

Havas & Sommer, "A High Frequency Power Supply For Induction Heating & Melting," IEEE Trans On Ind. Electronics & Instrumentation, June 1970, pp. 321–326.

Mapham, "A Low Cost, Ultrasonic Frequency Inverter Using A Single SCR," G.E. Application Note, 200.49, February, 1967.

Bedford & Hoft, "Principles of Inverter Circuits," Wiley & Sons, 1964, pp. 129–141.

Primary Examiner—Bruce A. Reynolds
Attorney, Agent, or Firm—Donald R. Campbell; Joseph T. Cohen; Jerome C. Squillaro

[57] ABSTRACT

A cooking appliance for inductively heating a cooking utensil comprises a flat induction heating coil mounted beneath a non-metallic support with a substantially unbroken utensil supporting surface. The induction heating coil is driven with an ultrasonic frequency wave generated by a static power conversion circuit typically formed of a rectifier and an inverter. The inverter is a series capacitor commutated sine wave inverter with a variable output frequency, variable input voltage, or variable commutating components to adjust the utensil heating level. The inverter is also controlled in on-off mode by a utensil temperature sensor.

12 Claims, 11 Drawing Figures

PATENTED JUN 4 1974 3,814,888
SHEET 1 OF 5
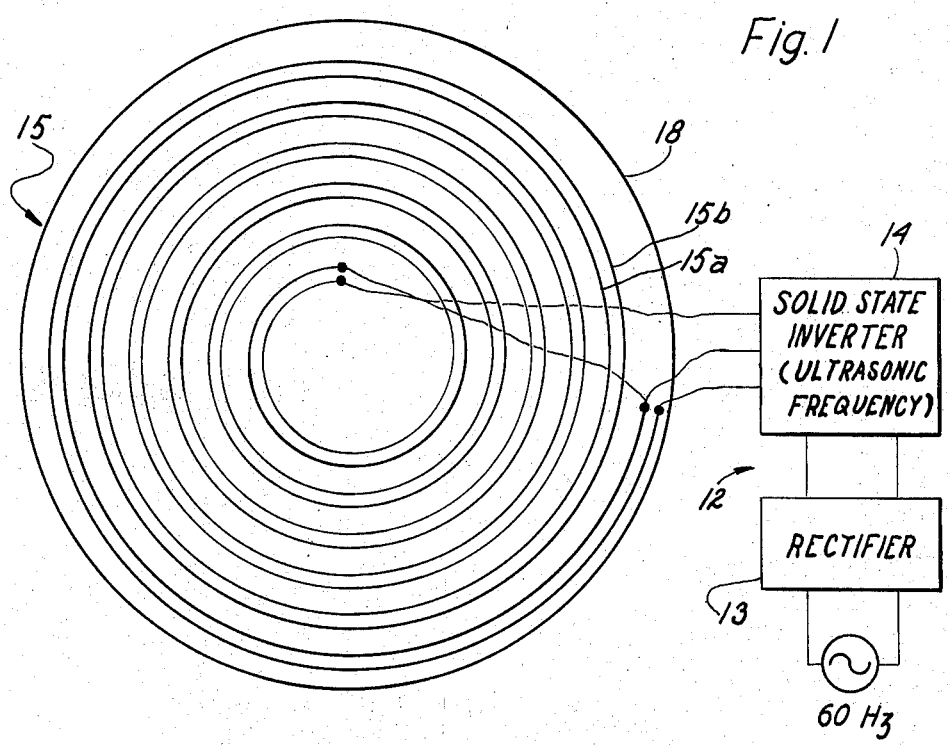
Fig.1
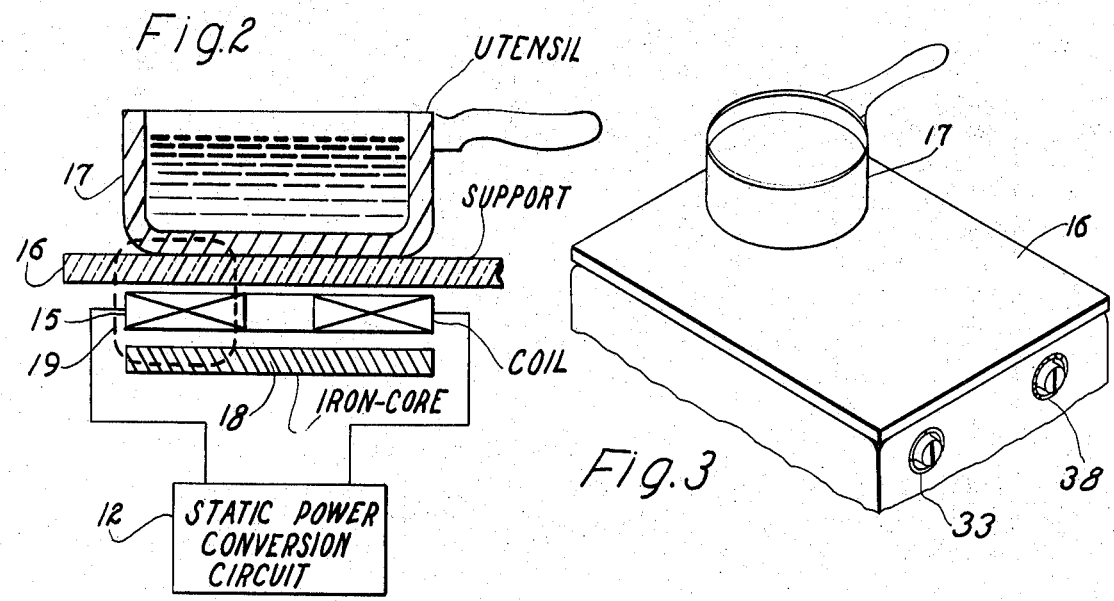
Fig.2
Fig.3
Inventors
David L. Bowers
Donald S. Heidtmann
John D. Harnden, Jr.
by Donald R. Campbell
Their Attorney

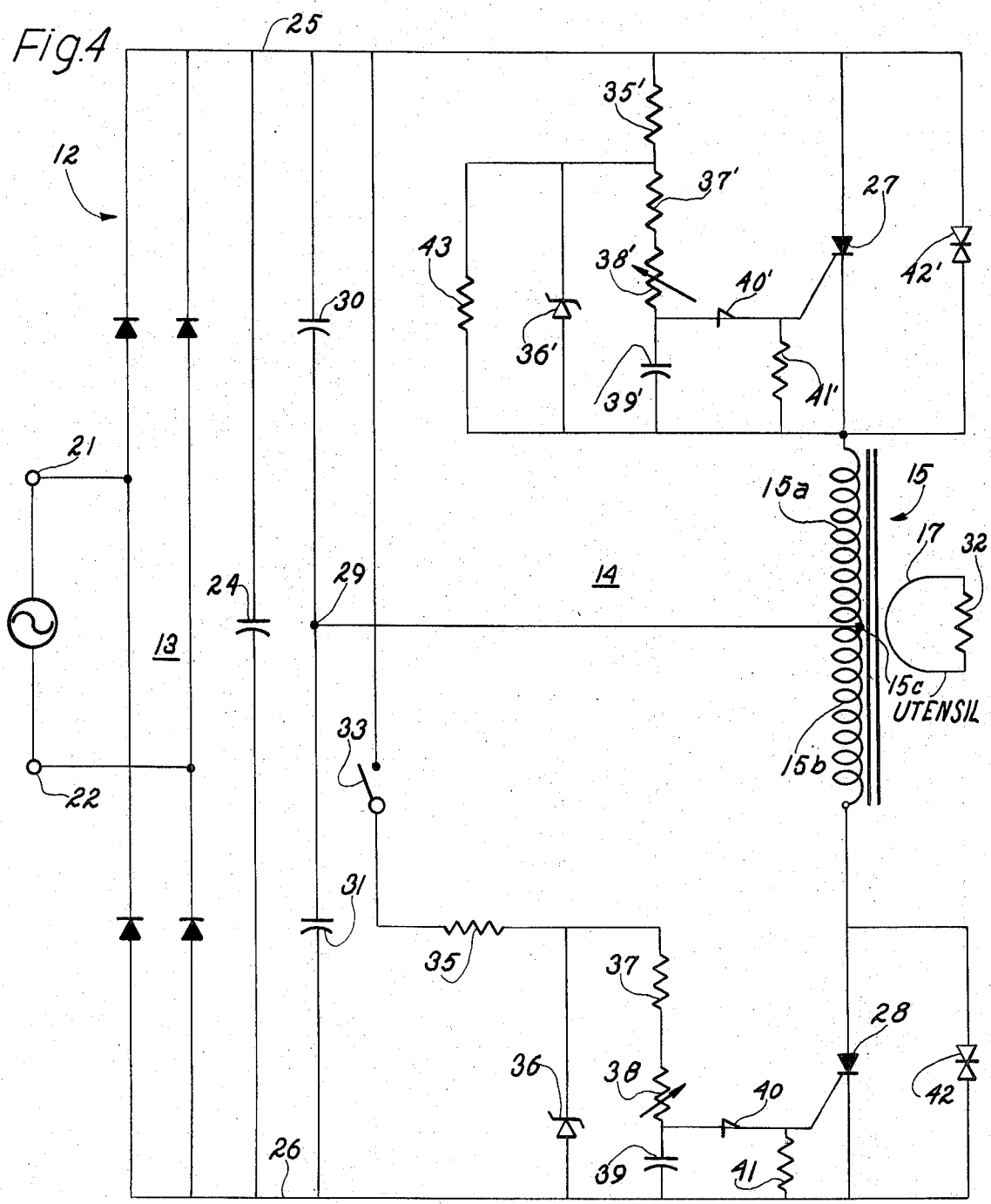

Inventors
David L. Bowers
Donald S. Heidtmann
John D. Harnden, Jr.
by Donald R. Campbell
Their Attorney 3,814,888

SOLID STATE INDUCTION COOKING APPLIANCE

BACKGROUND OF THE INVENTION

This invention relates to cooking appliances based on induction heating, and more particularly to solid state induction cooking appliances operated in the ultrasonic frequency range.

At present, food is ordinarily cooked on a gas range or an electric range with the food containing utensil directly in contact with the gas flame or electric heating resistance coil. Transfer of heat to the utensil is by the inefficient processes of conduction, convection, and radiation, and there are additional heat losses to the surrounding atmosphere. The temperature of the heat source is therefore quite high and due to the presence of a grease film results in the discoloration of the utensil. There is also a cleaning problem in removing spilled charred food and grease from the utensil and the exposed burner or coil unit.

The application of induction heating to heat a cooking utensil directly or by means of a metallic plate on which the utensil is supported has been known generally for a number of years but has not resulted in a successful product. The basic mechanism is that an alternating magnetic field produced by an induction heating coil is magnetically coupled across an air gap with the utensil bottom or support plate, which acts as a single turn secondary winding. Prior art induction cooking appliances were referred to as eddy current cookers because it was believed that heating was produced mainly by the circulation of induced eddy currents in the utensil. Since heat is generated only in the metallic utensil where it is wanted, the process is theoretically efficient. In practice, however, previous equipment for producing the varying magnetic field was unsatisfactory. Electric ranges using available line frequencies of 50 Hz or 60 Hz to energize the induction coil were inadequate and cumbersome due to the amount of magnetic flux required. Because of the bulk, expense, and operating problems associated with high frequency power sources as then known, eddy current cookers were proposed that employ an electric motor to rotate a horizontal disk with a circular arrangement of alternately poled permanent magnets. The rotating magnets created an alternating magnetic field that was magnetically coupled to the utensil to heat it. Besides being impractically large for a modern range with an oven or for a counter-top cooking or warming appliance, there is inefficient power conversion since the electrical power is handled twice in driving the motor and then generating the alternating magnetic field. Other disadvantages such as vibration, noise and poor method of power control make these eddy current cookers unattractive for wide usage.

The advent of solid state power conditioning makes possible the solution to a number of problems associated with the earlier induction cooking appliances, including high cost and reliability of higher frequency power generation. The present invention is directed to this and other aspects of improved domestic and commercial cooking appliances based on the principles of induction heating.

SUMMARY OF THE INVENTION

In accordance with the invention, a solid state cooking appliance for inductively heating a cooking utensil comprises a substantially non-metallic plate-like support having a substantially unbroken and preferably planar utensil supporting surface. A flat or nominally flat induction heating coil mounted adjacent the support generates an alternating magnetic field that extends across a gap including the support so as to be capable of coupling with the metallic portions of the utensil. A static power conversion circuit most commonly including a rectifier and a solid state inverter converts a supply voltage to an ultrasonic output frequency wave for driving the induction heating coil.

In the embodiments described here the solid state inverter is a series capacitor commutated sine wave inverter in the half bridge circuit configuration employing two controlled solid state power devices. In one form the induction heating coil comprises a pair of series aiding equal-turn coils connected in series with the power devices, and has the dual function of being the commutating inductance in the resonant commutation circuits. In another form the induction heating coil is a single spiral coil coupled in a bidirectional conducting branch of the inverter, and a separate commutating inductor is provided. The inverter output frequency is variable to adjust the power coupled to the utensil and therefore the cooking temperature. Other techniques for controlling output power are to change the input voltage by using a phase controlled rectifier, change the amount of commutating capacitance, and use a tapped induction heating coil. Furthermore, a sensor responsive to the utensil temperature such as a thermostat can be used to control the inverter.

BRIEF DESCRIPTION OF THE DRAWINGS

FIG. 1 is a block diagram of a solid state power converter for supplying ultrasonic frequency power to a flat spiral induction heating coil, shown in plan view, in a cooking appliance constructed according to the teaching of the invention;

FIG. 2 is a diagrammatic vertical cross-sectional view illustrating the relation of the induction heating coil to the utensil support and cooking utensil;

FIG. 3 is a simplified perspective view showing the smooth utensil support of the cooktop unit with a utensil in cooking position;

FIG. 4 is a detailed schematic circuit diagram of one embodiment of the static power converter comprising a rectifier and series resonant inverter using the induction heating coil in a dual function as the commutating inductance;

DESCRIPTION OF THE PREFERRED EMBODIMENTS

Figure 5A:
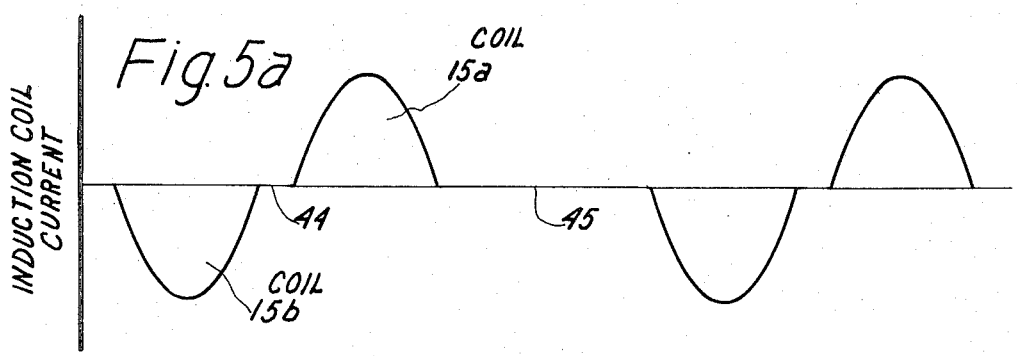
FIGS. 5a and 5b are waveform diagrams illustrating the current supplied to the induction heating coil by the FIG. 4 circuit for two different repetition rates of the solid state switches to adjust the amount of heat generated in the utensil.

The induction cooking appliance shown in FIGS. 1–3 will be described with regard to an induction surface unit in an electric range, but essentially the same structure and circuitry can also be included in a counter-top food cooking or warming appliance. The static power conversion circuit indicated generally at 12 is especially suitable for energization from a single phase commercially available 60 Hz, 120 volt or 240 volt source of alternating current power, but the equipment can be designed for use with other low frequency, low voltage sources or a d-c source in appropriate cases. Static power converter 12 comprises generally a rectifier 13 and a solid state inverter 14 for converting the unidirectional rectifier output to an ultrasonic frequency wave for driving the induction heating coil 15. Induction heating coil 15 is a single layer, annular, flat spiral iron-core coil wound with insulated round conducting wire or flat strip with a rectangular cross section. In order to generate sufficient magnetic flux to heat the utensil to the desired temperature, coil 15 in general is tightly wound with succeeding insulated turns immediately adjacent one another. For purposes of illustration, the coil is shown somewhat diagrammatically in FIG. 1.

In the cooking appliance (FIG. 2), induction heating coil 15 is appropriately mounted in a horizontal position immediately below a non-metallic support 16 typically made of a thin sheet of glass or plastic. If required, support 16 can have some metallic content for electrostatic shielding or decorative purposes, but this is necessarily limited to a small amount to permit nearly full power to be coupled to the utensil. Non-metallic support 16 is commonly referred to as the cooking surface and supports the metallic cooking utensil 17 to be heated. Cooking utensil 17 is more particularly an ordinary cooking pot or pan, a frying pan, or some other available metallic utensil used in food preparation. The utensil can be made of a magnetic material such as magnetic stainless steel or cast iron, a non-magnetic material such as aluminum, or a laminate product as for instance copper on stainless steel. Special cooking utensils are not required, although the best and most efficient results are obtained by optimizing the size, shape, and material of the cooking utensil. It is important to impedance match the utensil and inverter for best overall efficiency. Usually high resistance magnetic materials give a better source-to-load match while obtaining a greater I²R loss. A gap of at least one-eighth inch is required between the top of coil 15 and the bottom of utensil 17 to allow space for the non-metallic support 16, and the gap is no greater than about one-half inch at the full power rating in order to couple sufficient power into the utensil bottom to produce adequate heating for cooking purposes. A ferromagnetic core 18 for induction heating coil 15 is mounted horizontally beneath the coil, spaced from the coil by a predetermined air gap. Core 18 is suitably a circular laminated steel plate with a radius approximately equivalent to that of coil 15. The ferromagnetic core serves as a high permeability path for the magnetic flux return, one such path being illustrated at 19.

Operation of solid state inverter 14 to impress an ultrasonic frequency wave on induction heating coil 15 results in the generation of a varying or alternating magnetic field. The alternating magnetic field produced at the top of coil 15 is coupled directly across the air gap and through non-metallic support 16 to utensil 17. An alternating magnetic field is also produced at the bottom of coil 15, and a portion of this magnetic flux is coupled to utensil 17 by means of the shortened magnetic return paths 19 provided by ferromagnetic core 18. An ultrasonic frequency above 18 kHz or so is normally considered to be the upper range of human hearing and is selected to make the cooking appliance inaudible to most people. An essential feature of the invention is the non-metallic support 16 which, as shown in FIG. 3, preferably has a smooth and unbroken surface. At ultrasonic frequencies there are insignificant reaction forces which if present would cause utensil 17 to move horizontally when placed on the cooking appliance above induction heating coil 15. The transfer of energy to utensil 17 to heat it is relatively efficient since heat is generated only in the utensil and little is lost because of a mismatch in size between the coil and utensil. Although induction heating coil 15 produces some heat and may require cooling, the surface of support 16 is relatively cool since the highest temperatures involved are about 450°F, the approximate maximum temperature to which the bottom of the utensil 17 is heated to cook food as for example in frying operations. Because of the cool cooking surface, spilled foods usually do not burn and char and hence both support 16 and utensil 17 are easy to clean. The cool, smooth cooking surface also makes it possible to use it before cooking, or even immediately after cooking, for other functions related to food preparation such as opening cans, trimming and cutting vegetables, transferring cooked food from the cooking utensil to a serving dish, etc. The utensil is heated more uniformly than is the case with the conventional gas range and resistance heating electric range. Another advantage of induction cooking is that induction heating results in a low thermal mass system. Since there is a relatively low storage of heat in utensil 17 itself, the temperature to which the utensil is heated can be changed rapidly, as from boiling to simmering to warming temperatures.

One embodiment of static power conversion circuit 12 for generating the ultrasonic or supersonic frequency wave for driving induction heating coil 15 is shown in FIG. 4. Solid state inverter 14 is a series capacitor commutated inverter in the half bridge configuration using thyristors as the current switching devices. This is a known type of inverter comprising a pair of series resonant circuits that generate opposite polarity sinusoidal pulses. Although rectilinear waveshapes can be used for induction heating, it is found that sine waves are preferred for induction cooking applications. This is because sine waves are easier on the solid state switching device, especially in view of the desire to operate at higher frequencies. The dynamic ratings of the device are more favorable for sine waves. From the use point of view, the harmonic content is also more favorable for sine waves which relates to rfi, tfi, and potential health problems. The innovation made in the inverter of FIG. 4 is that induction heating coil 15 has the dual function of being the commutating inductance for the series resonant circuits.

The power converter input terminals 21 and 22 are adapted to be connected to a 120 volt, 60 Hz a-c supply voltage. The power supply section of the converter circuit includes a full wave diode bridge rectifier 13 and a filter capacitor 24. A constant unidirectional voltage is provided for inverter 14 between d-c supply terminals 25 and 26. Inverter 14 comprises essentially a first thyristor 27, induction heating coil 15, and a second thyristor 28 connected in series between d-c supply terminals 25 and 26. Induction heating coil 15 is wound as a pair of series aiding, equal-turn coils 15a and 15b, and the junction 15c of the two coils is connected directly to the junction point 29 between two commutating capacitors 30 and 31 which in turn are connected in series between the d-c supply terminals.

In FIG. 1 is shown the physical arrangement of induction coil 15 to achieve the electrical connection shown in FIG. 4. The equal-turn coils 15a and 15b are wound two-in-hand using insulated round copper wire. These coils are known as flat spiral coils or pancake coils. While coil 15 is ordinarily flat, it is within the scope of the invention to use a nominally flat coil such as one that is slightly dished to improve the magnetic field distribution. To obtain the series aiding connection of the two coils 15a and 15b, the inner end of coil 15a is connected to the outer end of coil 15b, and this is the point 15c shown in FIG. 4. Coils 15a and 15b, of course, need not be identical. With respect to the utensil load, induction heating coil sections 15a and 15b respectively function as the primary winding of an iron-core transformer. Utensil 17 functions as a single turn secondary winding with a series resistance 32 representing the resistive part of the I²R, eddy current, and hysteresis losses. The losses in utensil 17 are the inverter load.

Thyristors 27 and 28 are preferably unidirectional conducting silicon controlled rectifiers, but other appropriate power semiconductors such as the diac or triac operated in unidirectional mode or pairs of transistors can also be used. These solid state power devices are described in greater detail in the Silicon Controlled Rectifier Manual, fourth Edition, published by the General Electric Company, Semiconductor Products Department, Electronics Park, Syracuse, New York, copyright 1967. In this type of series capacitor commutated inverter circuit, thyristors 27 and 28 conduct alternately and the commutating circuit for each device is the series resonant circuit comprising induction heating coil section 15a or 15b in series with the respective commutating capacitors 30 and 31. Strictly speaking, the commutating inductance in each half cycle includes not only the inductance of induction heating coil sections 15a or 15b, but also the reflected equivalent inductance of utensil 17. The latter is usually the minor part of the commutating inductance, however. Both the upper and lower series resonant circuits are tuned to resonance at a resonant frequency higher than the highest desired inverter output frequency. Turning on thyristor 27, the other thyristor assumed to be non-conducting, causes a damped half sinusoidal pulse of current to flow through induction heating coil section 15a as commutating capacitor 31 charges and commutating capacitor 30 simultaneously discharges through thyristor 27 and coil 15a. At the end of the oscillatory half cycle, the current in the series resonant circuit theoretically approaches zero and the potential at junction point 29 between commutating capacitors 30 and 31 rises above the voltage on d-c positive supply bus 25 thereby reverse biasing thyristor 27 so that it turns off. When rendered conductive, the other thyristor 28 in the negative half cycle by autotransformer action causes coil 15a to apply a sharp positive pulse to the cathode of thyristor 27, assuring its complete turn-off.

The gating circuits for thyristors 27 and 28 have a reference-slave relationship so that actuating the reference gating circuit at a selected time causes a complete cycle of operation of the inverter circuit including automatic energization of the slave gating circuit. The repetition rate of the reference gating circuit is further controllable to adjust the power in watts supplied to utensil 17 to heat the utensil to different temperatures. The reference gating circuit for thyristor 28 is controlled by a switch 33 connected to positive d-c supply terminal 25. The reference gating circuit includes a resistor 35 connected in series with a Zener diode 36 to provide a regulated source of voltage for an RC charging circuit. The timing circuit connected across Zener diode 36 includes a pair of resistors 37 and 38, one of which is adjustable, and a timing capacitor 39. Adjustable resistor 38 is available to the user of the cooking appliance to adjust the time constant of the timing circuit and therefore the repetition rate of the generation of firing pulses. On-off switch 33 is also mounted on the appliance as shown in FIG. 3 to be manually actuated by the user. Of course, both controls can be on a single knob. A Shockley diode 40 or other appropriate voltage sensitive signal level semiconductor is connected to the junction of resistor 38 and timing capacitor 39 and also to the gate electrode of thyristor 28. Shockley diode 40 breaks over and becomes conductive upon the charging of timing capacitor 39 to a predetermined voltage. The reference gating circuit is completed by a biasing resistor 41 in the cathode-gate circuit of thyristor 28. A thyrector 42 placed across the load terminals of thyristor 28 provides overvoltage protection for the device. The slave gating circuit associated with the other thyristor 27 is similar and identical components are designated by corresponding primed numerals. The only difference is that a resistor 43 is connected directly across Zener diode 36' to provide a bypass of the slave gating circuit for a purpose to be explained.

The operation of an induction cooking appliance employing the static power conversion circuit illustrated in FIG. 4 will be reviewed. With both thyristors 27 and 28 in the non-conducting state, any leakage current is shunted around thyristor 27 through resistors 35' and 43 and the full d-c voltage is impressed upon the other thyristor 28. The initial closing of switch 33 applies voltage to the reference gating circuit for firing thyristor 28. Switch 33 is not closed until the circuit is energized and d-c power is available. An approximately constant source of voltage for the timing circuit is provided by Zener diode 36, and the voltage across timing capacitor 39 builds up at a rate dependent upon the time constant of the series RC circuit comprising elements 37–39. At a predetermined voltage, Shockley diode 40 conducts and a gating signal is applied to thyristor 28 as timing capacitor 39 discharges through diode 40 and the gate-cathode circuit of the thyristor, thereby also resetting the timing capacitor. Thyristor 28 begins to conduct and places the voltage on charged commutating capacitor 31 across induction heating coil section 15b, and at the same time by autotransformer action a strong reverse voltage pulse is applied to thyristor 27. A negative half sinusoidal current pulse is generated in the oscillatory series resonant circuit, and thyristor 28 conducts until the current through the device falls below the holding value. Commutating capacitor 31 discharges while at the same time commutating capacitor 30 charges and at the end of the half cycle junction point 29 is negative relative to d-c supply bus 26. The voltage across charged commutating capacitor 30 is the source voltage for the slave gating circuit associated with thyristor 27.

Figure 5B:
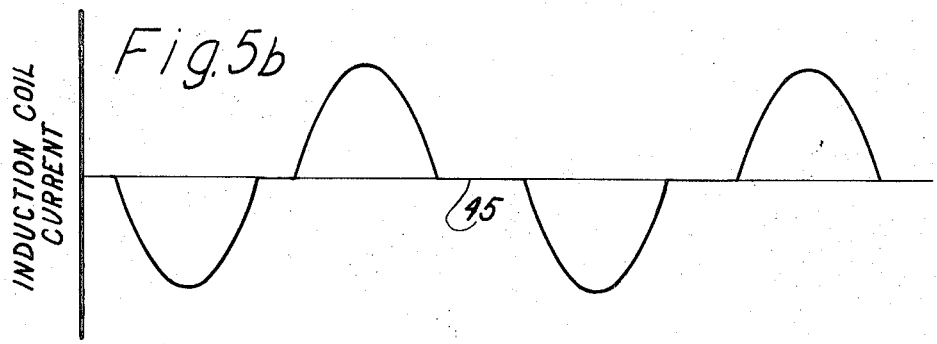

The slave gating circuit associated with thyristor 27 operates in the same manner as the reference gating circuit. The voltage across thyristor 27 is varying but the voltage to the timing circuit in the slave gating circuit is regulated by Zener diode 36'. After the predetermined time delay for timing capacitor 39' to charge and render conductive Shockley diode 40', thyristor 27 fires, thereby placing charged commutating capacitor 30 across induction heating coil section 15a and inducing by transformer action a sharp negative pulse in induction heating coil section 15b that assures turn off of thyristor 28. A positive polarity half sinusoidal pulse is generated in the upper series resonant circuit. Each time a sinusoidal pulse of current flows in induction heating coil sections 15a and 15b, of course, voltages and currents as determined by the transformer laws are induced in utensil 17 to cause inductive heating of the utensil. The induction coil current wave shapes are shown in FIG. 5a. Half sinusoidal pulses of opposite polarity are produced in induction heating coil sections 15b and 15a, with the time delay between the two opposite polarity half sinusoids allowing turn-off time for thyristor 28 being shown at 44. The time delay 45 between complete cycles of the inverter output current is dependent upon the repetition rate of the reference gating circuit as determined by the setting of adjustable resistor 38. By increasing the repetition rate, as is shown in FIG. 5b, the time delay 45 between complete cycles is shortened thereby increasing the average power supplied to the utensil. Thus, increasing and decreasing the repetition rate changes the inverter output frequency and the power in watts applied to utensil 17 to provide an adjustment for the heating level and cooking temperature. The frequency limit at one end is the threshold of ultrasonic frequencies (18 kHz) while at the upper end is less than the resonant frequency of the series commutating circuits.

Figure 7:
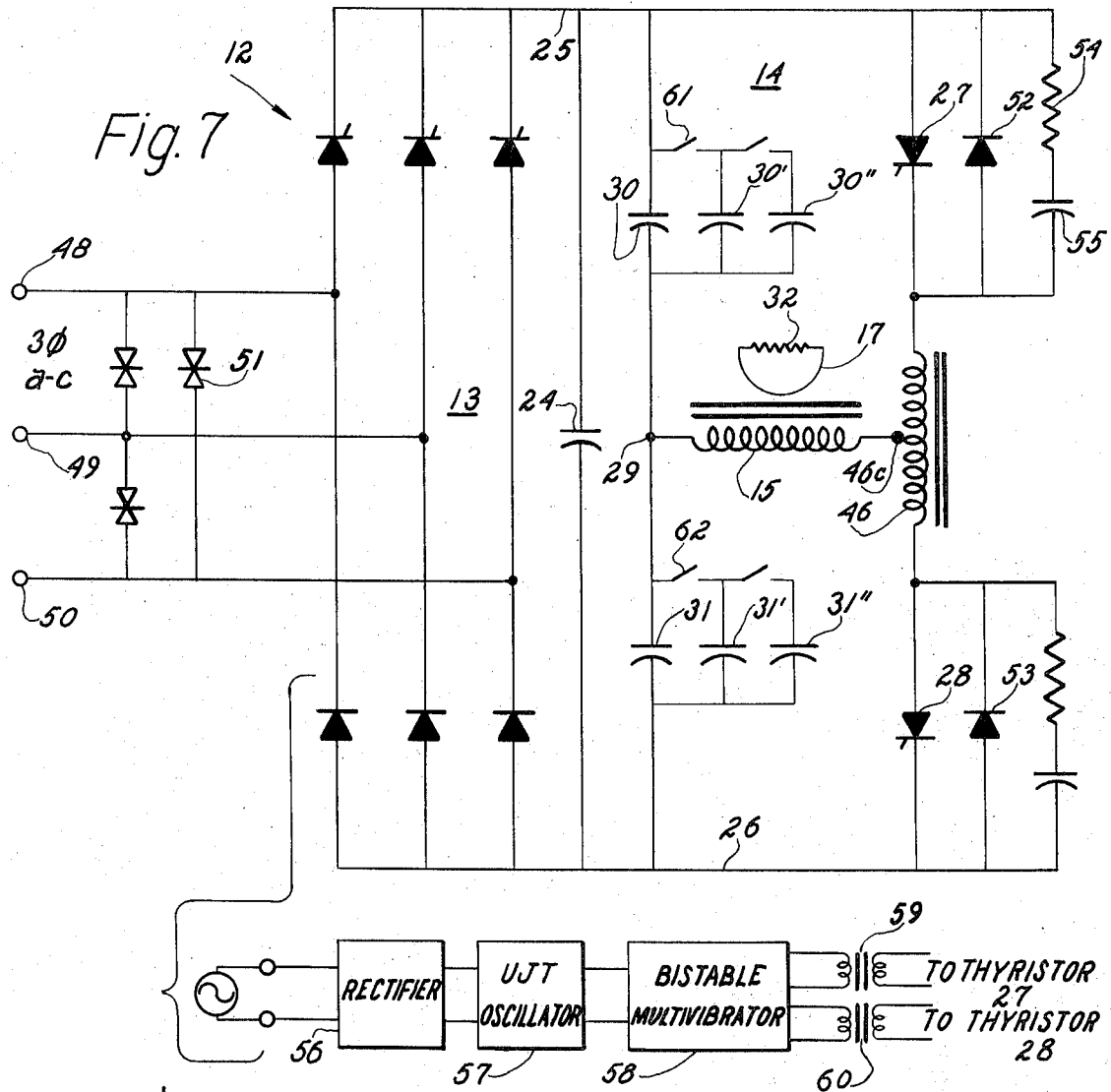
FIG. 7 is a detailed schematic circuit diagram of another embodiment of the invention similar to FIG. 4 but with a modified inverter and firing circuit and a different induction heating coil connection.

In order that there be insignificant reaction forces acting on utensil 17 tending to cause it to move horizontally or to vibrate, it will be noted that it is necessary to use a sufficently large filter capacitor 24 with a single phase rectified source as illustrated to obtain substantial smoothing of the d-c input voltage to the inverter. Furthermore, the voltage regulated timing circuit is needed to assure the even application of power to the utensil. Too much scrimping as to these circuit details results in the production of mechanical forces acting on the utensil. By contrast the applicance of FIG. 7 is supplied by a three phase voltage operating into a three phase rectifier that produces a more regulated d-c voltage. Consequently filter capacitor 24 has less stringent requirements and a voltage regulated gating circuit may not be needed.

The specific reference and slave gating circuits for thyristors 28 and 27 in FIG. 4 can be replaced by other gating circuit arrangements. For instance, both firing circuits for both thyristors can be slaved using the voltage appearing across the respective power devices. In another variation, only one Shockley diode gating circuit is used for both thyristors, the difference being that the output from the one gating circuit is applied to a pulse transformer having two secondary windings, one winding applied to the gate-cathode of each thyristor unit. The gating circuit must be operated at twice the frequency as compared to FIG. 4. In any of these circuits the Shockley diode can be replaced by a unijunction transistor, and zinc oxide varistors can be used in place of protective thyrectors 42 and 42'. Other gating circuit arrangements are possible in which the gating circuits for thyristors 27 and 28 are synchronized without using the slave gating circuit approach.

Figure 6:
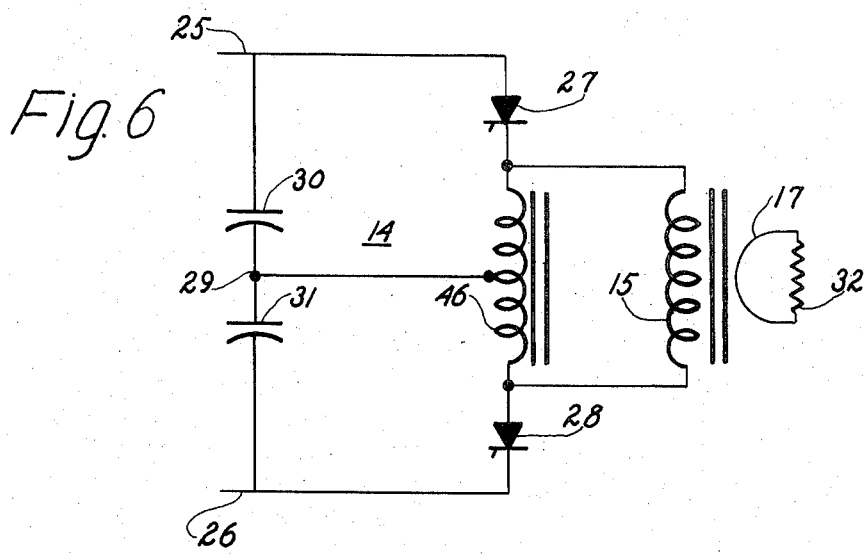
FIG. 6 is a simplified circuit diagram of a modification of the inverter of FIG. 4 in the frequency doubler configuration with the addition of a commutating inductor distinct from the induction heating coil.

A workable range induction surface unit requires that the maximum power supplied to induction heating coil 15 be about 1 to 1½ kilowatts. The power requirements of a counter-top warming appliance are more modest, and maximum power in the range of 200–400 watts is sufficient. With the proper choice of components, the induction cooking appliance described in FIGS. 1–4 can be built in either size so as to be usable with the ordinary sizes of available cooking utensils. These cooking appliances furthermore are energized by a 120 volt line rather than requiring special 240 volt service. An advantage of the solid state inverter of FIG. 4 is that induction heating coils 15a and 15b have the dual function of being the load transformer and the commutating inductance of the series capacitor commutating circuits. The duty is placed upon induction coil unit 15 of supplying the proper amount of commutating inductance in normal operation of the inverter as well as being able to commutate under no-load conditions. Loss of load can easily happen in an induction cooking appliance since it is to be expected that utensil 17 will be removed from the appliance temporarily without shutting off the power or removed after the food is cooked before turning off the unit. At the same time there must be a workable transformer relationship between induction coil unit 15 and utensil 17. The modification of inverter 14 shown in FIG. 6 employs a center-tapped commutating inductor 46 that is separate and distinct from induction heating coil 15. In this way the two inductive components can be designed to optimize the individual circuit functions that each performs. In the modification induction heating coil 15 is connected across commutating inductor 46. This is known as the half bridge, frequency doubler circuit configuration. Induction heating coil 15 in this instance is a single flat spiral coil, rather than two separate series aiding equal-turn coils as shown in FIG. 1.

The embodiment of power converter circuit 12 illustrated in FIG. 7 illustrates still other modifications of the basic series capacitor commutated inverter 14 and other output power control techniques. A polyphase source of voltage is used for this power converter, and is preferably a 208 volt, three-phase source. Thyrectors 51 are connected between input terminals 48–50 to suppress any transient voltages on the power line to prevent damage to the inverter circuit. Rectifier 13 in this case is a three-phase, phase controlled bridge rectifier employing three thyristors and three diodes. The use of a phase controlled rectifier to supply a variable d-c voltage to the inverter is another technique for controlling the output power that can be used independently or in combination with the frequency deviation method to change the heating level in the utensil. In inverter 14, a separate center-tapped commutating inductor 46 is used, and the single flat spiral, iron-core induction heating coil 15 has a series load connection in that it is connected in the common bidirectional conducting branch of the two series resonant circuits between the center-tap 46c of the commutating inductor and the junction point 29 between commutating capacitors 30 and 31. The function of parallel capacitors 30' and 30" and parallel capacitors 31' and 31" is explained later. In addition, feedback diodes 52 and 53 are connected directly across the load terminals of thyristors 27 and 28. A resistor-capacitor network 54, 55 is also connected across each power thyristor for $dv/dt$ protection. A different type of gating circuit for thyristors 27 and 28 is used, and includes a rectifier 56 connected across a single phase source of a-c voltage for supplying unidirectional voltage to a unijunction transistor oscillator 57. A bistable multivibrator 58 changes state in response to pulses generated by unijunction transistor oscillator 57 at twice the output frequency of the inverter, and pulse transformers 59 and 60 respectively connected in each branch of the bistable multivibrator alternately supply firing pulses to thyristors 27 and 28.

Figure 8:
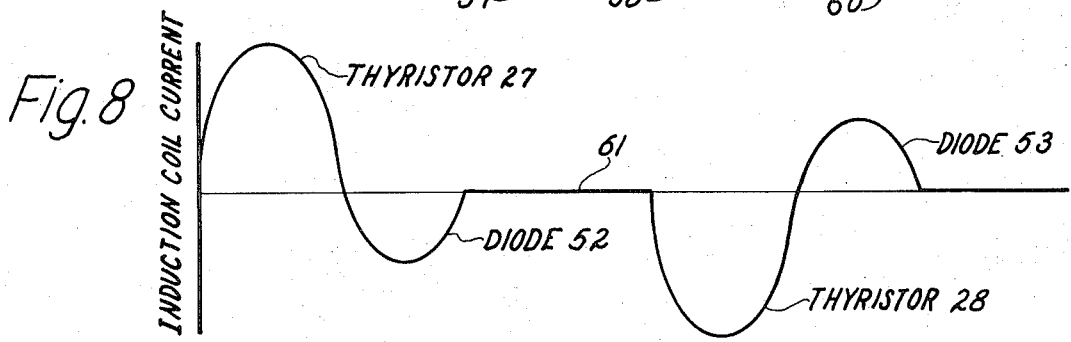
FIG. 8 is a waveform diagram of the induction coil current produced by the FIG. 6 power converter.

Briefly describing the operation of the FIG. 7 circuit, it is assumed that thyristor 27 is initially rendered conductive by a gating circuit comprising components 56–60. Referring also to the current waveforms in FIG. 8, a half-sinusoidal pulse flows through induction heating coil 15 as previously explained. At the end of the half cycle, junction point 29 between the commutating capacitors oscillates above the potential of positive d-c supply terminal 25, and the current in the oscillatory circuit reverses and flows through diode 52, thereby reverse biasing thyristor 27 and helping to turn it off. The next pulse from the gating circuit renders conductive the other thyristor 28, and sinusoidal current initially flows through induction heating coil 15 and thyristor 28 in one direction, and then through diode 53 and coil 15 in the other direction. Variation of the time delay 61 between complete cycles of induction coil current modulates the power supplied to utensil 17. A resistor in the timing circuit of unijunction oscillator 57 can be adjusted to change the frequency of the oscillator and hence the repetition rate or output frequency of the inverter.

Figure 9:
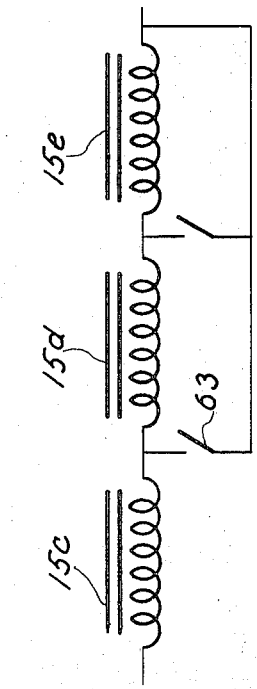
FIG. 9 is a sketch of a tapped induction heating coil that can be used in the FIG. 7 converter to control the output power.

Another technique for modulating the power output of the inverter is to change the total commutating capacitance by using a tapped capacitor bank in each series resonant circuit. Thus in FIG. 7 additional commutating capacitors 30' and 30" are connected in parallel with capacitor 30 and switched in and out of the circuit by means of switches 61. In similar fashion, switches 62 selectively connect capacitors 31' and 31" in parallel with commutating capacitor 31. Decreasing the total commutating capacitance in a series resonant circuit increases the series resonant impedance sufficiently to lower the current in induction heating coil 15. Conversely, increasing the amount of commutating capacitance increases the current amplitude. The tap changing is performed with the unit turned off. Referring to FIG. 9, it is also possible to use a sectional induction heating coil for the same purpose of modulating the power output either independently of or in cooperation with a change of commutating capacitance. Switching one or both of coil sections 15d and 15e in series with section 15c by selective operation of switches 63 changes the total commutating inductance in the circuit. When the coil sections are concentric with one another, energizing different combinations of coil sections changes the effective diameter of the induction heating coil so as to couple more efficiently with utensils of different diameters.

Figure 10:
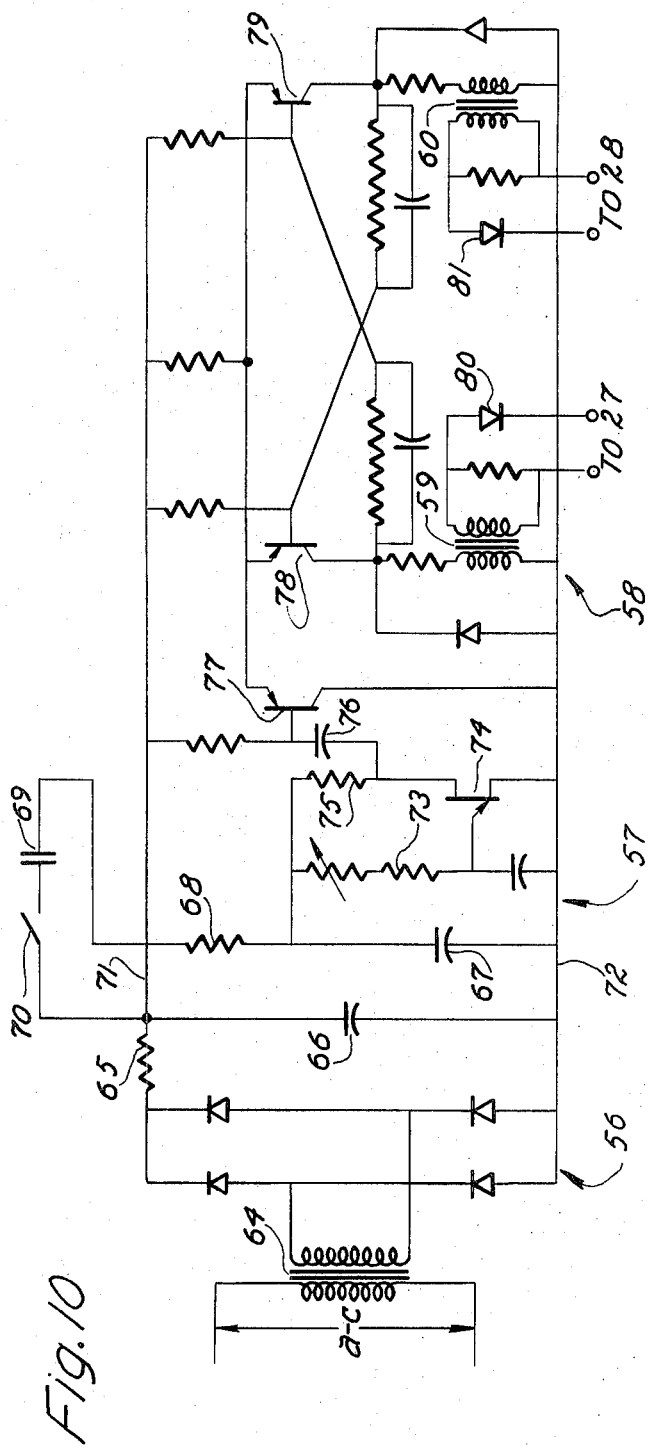
FIG. 10 is a detailed circuit diagram of the firing circuit illustrated in block diagram form in FIG. 7, with the modification that a temperature sensor is employed to control the operation of the firing circuit.

FIG. 10 is a detailed circuit diagram of the thyristor gating circuit shown in block diagram form in FIG. 7. The modification is made that the inverter operation is controlled in on-off mode by a suitable sensor for sensing the temperature of the utensil. The control circuit is energized by a stepdown transformer 64 connected to a separate source of 120 volt, 60 cycle power. The output voltage of full wave diode rectifier 56 is further reduced by dropping resistor 65 before being applied to filter capacitor 66. The power supply for unijunction relaxation oscillator 57 is the voltage across a capacitor 67. Capacitor 67 is connected in series with a charging resistor 68, the contacts 69 of a starting relay, and a thermostat 70 between the low voltage d-c supply terminals 71 and 72. Relay contacts 69 are closed by the voltage appearing across filter capacitor 24 in the power circuit (the coil circuit is not shown), with the result that the time delay required to charge capacitor 67 prevents unijunction transistor oscillator 57 from oscillator immediately when the relay contacts close thus giving filter capacitor 24 in the power circuit sufficient time to charge. The conventional RC timing circuit 73 for unijunction transistor 74 includes a variable resistor that functions in the same manner as adjustable resistor 38 in FIG. 4 to set the power level. The pulse developed across resistor 75 when unijunction 74 is rendered conductive is coupled by capacitor 76 to the base of a transistor amplifier 77. The amplified pulse is applied to the emitters of a pair of transistor 78 and 79 within bistable multivibrator 58 and causes them to change state in flip-flop fashion. As was previously mentioned, these pulses are generated at twice the inverter repetition rate. Multivibrator 58 is a conventional transistor RC cross-coupled bistable multivibrator in which the primary windings of pulse transformers 59 and 60 are connected in series with the respective collector resistors. Steering diodes 80 and 81 in the respective pulse transformer secondary winding circuits assure that a firing pulse of the proper polarity is applied to the gate-cathode of the respective power thyristors 27 and 28. A similar firing circuit is disclosed on page 53 of the General Electric SCR Manual, second edition, copyright 1961.

Thermostat 70 or another suitable temperature sensor is located so as to sense the temperature of the utensil. Upon reaching the set temperature, thermostat 70 opens and disables unijunction transistor oscillator 57. The inverter operation therefore stops so long as thermostat 70 is open. By using the type of thermostat that recloses when the temperature being sensed drops below a predetermined level, on-off power control of the inverter is obtained. During the spaced intervals of operation of the inverter, sufficient power is supplied to the utensil to raise its temperature to the temperature set on the thermostat. The series resonant inverter is amenable to operation in this mode since the removal of gating pulses stops the operation of the inverter. Furthermore, the output frequency does not drop into the audio range during the starting and stopping of the inverter in on-off mode operation.

In summary, a solid state cooking appliance features a static power conversion circuit that generates an ultrasonic frequency output wave for energizing an induction heating coil. The induction heating coil is a nominally flat pancake-type coil mounted adjacent a non-metallic utensil support and produces an alternating magnetic field that couples with metallic portions of the utensil placed on the support. Another feature is the substantially unbroken, cool, planar utensil supporting surface made possible by the efficient transfer of power to the utensil and lack of reaction forces. The power conversion circuit typically includes a rectifier and a solid state inverter with provision to adjust the power supplied to the utensil and therefore the cooking temperature. The physical size and arrangement of the components of this solid state cooking appliance are such that they can easily be incorporated in an attractive conventionally sized cooktop unit, range, or counter-top appliance.

While the invention has been particularly shown and described with reference to several preferred embodiments, it will be understood by those skilled in the art that various changes in form and details may be made therein without departing from the spirit and scope of the invention.

What we claim as new and desire to secure by Letters Patent of the United States is:

1. A solid state cooking appliance for inductively heating a cooking utensil comprising
   a substantially non-metallic, rigid plate-like support having a substantially unbroken utensil supporting surface,
   a nominally flat induction heating coil mounted adjacent said support for generating an alternating magnetic field that extends across a gap including said support and beyond the utensil supporting surface, and
   a static solid state power conversion circuit for converting a supply voltage to an ultrasonic output frequency wave that drives said induction heating coil, wherein
   said static power conversion circuit includes unidirectional voltage supply terminals and a solid state inverter for converting the unidirectional voltage to the ultrasonic output frequency wave, and
   said inverter includes a pair of controlled solid state power devices, and means for rendering conductive said solid state power devices alternately for intervals of conduction at a rate to produce said ultrasonic output frequency wave.

2. A cooking appliance according to claim 1 wherein said induction heating coil comprises a pair of series aiding coils having their junction connected to a bidirectional conducting branch of said inverter.

3. A cooking appliance according to claim 1 wherein said nominally flat induction heating coil has a ferromagnetic plate structure at least underlying said coil to serve as a high permeability path for return magnetic flux.

4. A solid state induction cooking appliance comprising
   a substantially non-metallic, rigid plate-like support having a substantially unbroken utensil supporting surface,
   a nominally flat induction heating coil mounted adjacent said support for generating an alternating magnetic field that extends across a gap including said support and is coupled with metallic portions of a cooking utensil placed thereon, and
   a static power conversion circuit including a solid state inverter for generating an ultrasonic output frequency wave that drives said induction heating coil,
   said inverter comprising a plurality of power semiconductors, and means for alternately rendering conductive said power semiconductors for desired intervals of conduction at a selected repetition rate.

5. A cooking appliance according to claim 4 further including user adjustable means for varying the repetition rate of intervals of conduction of said power semiconductors to control the power supplied to said cooking utensil and the temperature to which said utensil is heated.

6. A solid state induction cooking appliance comprising
   a substantially non-metallic, plate-like support having a substantially unbroken utensil supporting surface,
   a nominally flat induction heating coil mounted adjacent said support for generating an alternating magnetic field that extends across a gap including said support and is coupled with metallic portions of a cooking utensil placed thereon, and
   a static power conversion circuit including a solid state inverter for generating an ultrasonic output frequency wave that drives said induction heating coil,
   said inverter comprising a plurality of power semiconductors, and means for alternately rendering conductive said power semiconductors for desired intervals of conduction at a selected repetition rate, wherein
   at least one of said power semiconductors is a thyristor, and said means for alternately rendering conductive said power semiconductors for desired intervals of conduction includes turn-on means for said thyristor and a resonant commutation circuit comprising commutation capacitor means and commutating inductance means, a substantial part of said commutating inductance means being provided by said induction heating coil.

7. A solid state induction cooking appliance comprising
   an induction heating coil for generating an alternating magnetic field for heating a cooking utensil, and
   a static power conversion circuit comprising a source of unidirectional voltage and a solid state inverter for generating an ultrasonic output frequency wave that drives said induction heating coil, wherein
   said inverter is a series resonant inverter including at least a pair of alternately conducting solid state power devices, firing means for turning on at least one of said solid state devices at a selected repetition rate, and commutation means including series connected commutation capacitor means and commutation inductance means tuned to resonance at a frequency greater than the ultrasonic output frequency, and said firing means is adjustable and turns on at least one of said solid state devices at a variable repetition rate to thereby modulate the power output of the inverter, and said firing means comprises an adjustable timing circuit with a user adjustable control element for setting the repetition rate.

8. A solid state cooking appliance for inductively heating a cooking utensil comprising
   a substantially non-metallic rigid plate-like support having a substantially unbroken utensil supporting surface,
   a nominally flat induction heating coil mounted adjacent said support for generating an alternating magnetic field that extends across a gap including said support and beyond the utensil supporting surface, and
   a static power conversion circuit including a solid state rectifier and a solid state inverter for generating an ultrasonic output frequency wave that drives said induction coil, wherein
   said inverter is a series capacitor commutated sine wave inverter including a pair of alternately conducting controlled solid state power devices, adjustable firing means for turning on said solid state devices at a variable repetition rate to modulate the output power and therefore the level to which the cooking utensil is heated, and commutation means comprising series connected commutation capacitor means and commutation inductance means tuned to resonance at a frequency greater than the maximum ultrasonic output frequency.

9. A cooking appliance according to claim 8 wherein said adjustable firing means includes a voltage regulated timing circuit for determining the repetition rate of generation of turn-on signals.

10. A cooking appliance according to claim 9 wherein both of said solid state power devices are gate controlled thyristors, and said firing means alternately supplies turn-on signals to both of said thyristors.

11. A solid state cooking appliance for inductively heating a cooking utensil comprising
   a substantially non-metallic, plate-like support having a substantially unbroken utensil supporting surface,
   a nominally flat induction heating coil mounted adjacent said support for generating an alternating magnetic field that extends across a gap including said support and beyond the utensil supporting surface, and
   a static power conversion circuit including a solid state rectifier and a solid state inverter for generating an ultrasonic output frequency wave that drives said induction coil, wherein
   said inverter is a series capacitor commutated sine wave inverter including at least a pair of alternately conducting solid state power devices, adjustable firing means for turning on at least one of said solid state devices at a variable repetition rate to modulate the output power and therefore the level to which the cooking utensil is heated, and commutation means comprising series connected commutation capacitor means and commutation inductance means tuned to resonance at a frequency greater than the maximum ultrasonic output frequency, and
   said induction heating coil is connected in series circuit relationship with said solid state power devices and has the dual function of being a substantial part of said commutating inductance means.

12. A cooking appliance according to claim 11 wherein said induction heating coil is comprised by a pair of series aiding coils having their junction coupled to said commutating capacitor means.

* * * * *